R. T. TODHUNTER.
NUT LOCK.
APPLICATION FILED JULY 25, 1912.
1,055,836.
Patented Mar. 11, 1913.
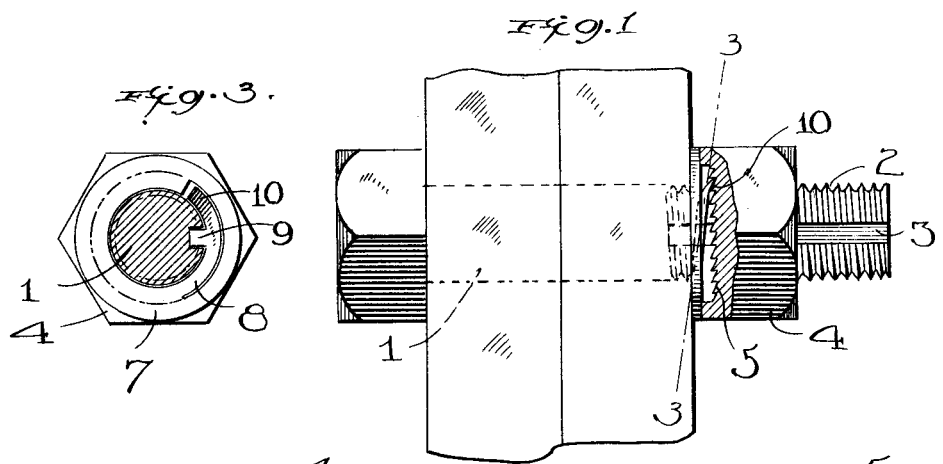
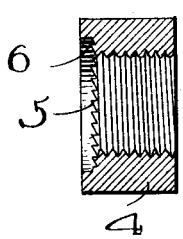
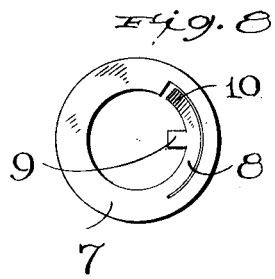
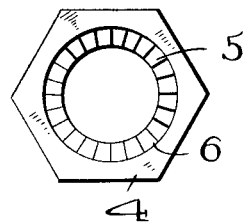
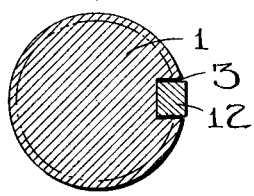
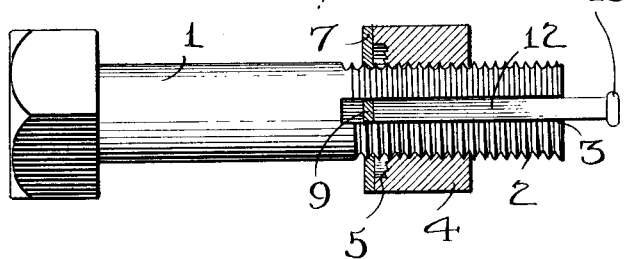
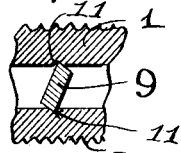
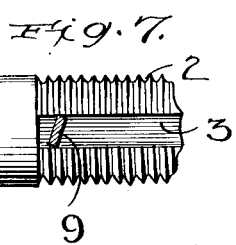
WITNESSES
INVENTOR
Richard T. Todhunter
By E. E. Vrooman, his Attorney

UNITED STATES PATENT OFFICE.

RICHARD T. TODHUNTER, OF BARNESBORO, PENNSYLVANIA.

NUT-LOCK.

1,055,836. Specification of Letters Patent. Patented Mar. 11, 1913.

Application filed July 25, 1912. Serial No. 711,541.

*To all whom it may concern:*

Be it known that I, RICHARD T. TODHUNTER, citizen of the United States, residing at Barnesboro, in the county of Cambria and State of Pennsylvania, have invented certain new and useful Improvements in Nut-Locks, of which the following is a specification, reference being had therein to the accompanying drawing.

This invention relates to nut locks and has for its object the production of an efficient means for preventing the nut from being rotated after the same has been threaded upon the bolt.

Another object of the invention is the production of a nut lock of the class described comprised of a minimum number of parts.

With these and other objects in view this invention consists in certain novel combinations, constructions, and arrangement of parts as will be hereinafter fully described and claimed.

In the accompanying drawings:—Figure 1 is a side elevation of the device showing the nut partly in section. Fig. 2 is a side elevation of a bolt showing the nut in longitudinal section. Fig. 3 is a section taken on line 3—3, of Fig. 1. Fig. 4 is a longitudinal section of the nut. Fig. 5 is a view of the rear side of the nut. Fig. 6 is a transverse section of the bolt. Fig. 7 is a fragmentary section of the bolt showing the lug carried by the washer positioned within the longitudinally extending groove. Fig. 8 is a side elevation of the washer. Fig. 9 is a fragmentary section of the bolt illustrating how the lug carried by the washer bites into the side walls of the longitudinally extending groove.

Referring to the accompanying drawings by numerals 1 designates a bolt which is provided with the threaded portion 2 upon its outer end. The longitudinally extending groove 3 is formed upon the bolt and within the threaded portion 2. A nut 4 is used in combination with the bolt and is provided with the ratchet 5 formed within the pocket portion 6. A washer 7 is used in combination with this device and is provided with the spring tongue 8, said spring tongue 8 carrying the lug 9, the outer end of the spring tongue 8 being bent in an outward direction as illustrated at 10. When the washer 7 is placed upon the threaded portion 2 the lug 9 will pass into the longitudinally extending groove 3. The nut 4 is then threaded upon the bolt until the outwardly bent portion 10 of the tongue 8 engages the ratchet 5 formed within the pocket 6 of the nut. It will be seen that when the tongue 8 engages the ratchet 5 of the nut 4, the lug 9 will be so turned within the longitudinally extending groove 3 as to force the corners 11 into a biting engagement with the side walls of the groove 3. By this means the washer will be prevented from becoming disengaged with the nut, therefore, the washer and nut will be held upon the bolt without the use of a secondary supporting means for the washer, which would be the case if the lug 9 did not bite into the side walls of the longitudinally extending groove 3. It will also be seen that by forming the ratchet 5 within the pocket 6 of the nut, the tongue 8 will fit within the pocket 6 and cannot become disengaged by some foreign object pushing it from engagement with the ratchet 5.

When it is desired to remove the nut from the bolt, a key 12 is provided with the enlarged head 13 which key is inserted in the longitudinally extending groove 3 and the end of the key 12 will bear against the lug 9, and will in this manner force the tongue 8 from engagement with the nut, and the corners 11 of the lug 9 will also be pushed from engagement with the side walls of the groove 3. When this is accomplished the nut can be easily removed from the bolt.

By use of this device a simple washer means has been produced whereby the nut can be positively locked upon the bolt.

Having thus described the invention what is claimed as new, is:—

In a device of the class described, a bolt provided with a longitudinal extending groove, a nut threaded upon said bolt, a washer carried by said bolt, said washer provided with a tongue cut from its inner portion, said tongue being formed approximately one-half the width of said washer and provided with a centrally located lug, said lug fitting in said groove, said tongue engaging said nut, said nut provided with means for engaging said tongue for preventing said nut from rotating in one direction, corners of said lug biting into the side walls of said groove when said tongue engages said nut, the outer portion of said washer formed adjacent said tongue constituting a bearing wall for said tongue, whereby said tongue will be held in a biting engagement with said groove and will prevent the tongue from springing outward.

In testimony whereof I hereunto affix my signature in presence of two witnesses.

RICHARD T. TODHUNTER.

Witnesses:
 ISRAEL HALLMAN,
 JOHN TODHUNTER.

Copies of this patent may be obtained for five cents each, by addressing the "Commissioner of Patents, Washington, D. C."